(12) United States Patent
Dames

(10) Patent No.: US 9,530,551 B2
(45) Date of Patent: Dec. 27, 2016

(54) SOLENOID ACTUATOR

(75) Inventor: Andrew Dames, Cambridgeshire (GB)

(73) Assignee: SENTEC LTD (GB)

( * ) Notice: Subject to any disclaimer, the term of this patent is extended or adjusted under 35 U.S.C. 154(b) by 907 days.

(21) Appl. No.: 13/509,114

(22) PCT Filed: Nov. 5, 2010

(86) PCT No.: PCT/GB2010/051849
§ 371 (c)(1),
(2), (4) Date: Jun. 22, 2012

(87) PCT Pub. No.: WO2011/058344
PCT Pub. Date: May 19, 2011

(65) Prior Publication Data
US 2012/0261499 A1 Oct. 18, 2012

(30) Foreign Application Priority Data

Nov. 10, 2009 (GB) .................... 0919645.2

(51) Int. Cl.
*F02M 51/06* (2006.01)
*H01F 7/16* (2006.01)
*H01F 7/122* (2006.01)

(52) U.S. Cl.
CPC .............. *H01F 7/16* (2013.01); *H01F 7/122* (2013.01); *F02M 51/061* (2013.01);
(Continued)

(58) Field of Classification Search
CPC .... F02M 51/06; F02M 51/00; F02M 51/0689; F02M 51/0692; F02M 51/0696; F02M 51/0603; F02M 51/0671; F02M 51/061; F02M 51/066; F02M 51/0685; F02M 51/0635; F02M 51/0642; F02M 51/0653; F02M 51/0614; F02M 51/0628; F02M 51/0632; F02M 51/0667; F02M 51/0675; B05B 1/30; B05B 12/00; B05B 1/3013; B05B 1/3026; B05B 1/304; B05B 1/3046; B05B 1/3053; H01F 1/18
(Continued)

(56) References Cited

U.S. PATENT DOCUMENTS 1,365,898 A 1/1921 Egerton
3,218,409 A * 11/1965 Lindsay ................. 335/154
(Continued)

FOREIGN PATENT DOCUMENTS

DE 3423469 * 1/1986 .............. H01F 7/14
DE 102005030453 1/2006
(Continued)

OTHER PUBLICATIONS

Patent Abstracts of Japan, English Abstract, Japanese Publication No. 2003007531 A, published Jan. 10, 2003, 1 page.
(Continued)

*Primary Examiner* — Arthur O Hall
*Assistant Examiner* — Christopher R Dandridge
(74) *Attorney, Agent, or Firm* — Ware, Fressola, Maguire & Barber LLP

(57) ABSTRACT

A short travel solenoid actuator (44) is disclosed which comprises at least one pole piece (47, 48), an armature (51), an electromagnet coil (46) arranged, in response to energization, to actuate the armature between first and second positions. A permanent magnet (52) is positioned and orientated so as to latch the armature in the first and second positions when the armature is in the first and second positions respectively. A spring (53) is arranged to bias the armature.

25 Claims, 13 Drawing Sheets

(52) U.S. Cl.
CPC ....... *F02M 51/066* (2013.01); *F02M 51/0653* (2013.01); *F02M 51/0685* (2013.01); *F02M 51/0689* (2013.01); *F02M 51/0692* (2013.01)

(58) Field of Classification Search
USPC .................................................. 239/569–588
See application file for complete search history.

(56) References Cited

U.S. PATENT DOCUMENTS

| | | | | |
|---|---|---|---|---|
| 3,234,436 | A | * | 2/1966 | Bieger ................. 335/268 |
| 3,379,214 | A | * | 4/1968 | Weinberg ............ 137/625.5 |
| 4,581,597 | A | * | 4/1986 | Walley ................. 335/179 |
| 4,749,892 | A | * | 6/1988 | Mesenich ............... 310/19 |
| 4,751,487 | A | | 6/1988 | Green, Jr. |
| 4,774,485 | A | | 9/1988 | Dietrich |
| 4,779,582 | A | | 10/1988 | Lequesne |
| 5,127,585 | A | * | 7/1992 | Mesenich ............ 239/585.5 |
| 5,494,219 | A | | 2/1996 | Maley et al. |
| 5,521,446 | A | | 5/1996 | Chalupa |
| 5,559,378 | A | * | 9/1996 | Oudet ................... 310/17 |
| 5,961,045 | A | | 10/1999 | Coldren et al. |
| 8,166,953 | B2 | | 5/2012 | Caley |
| 2002/0158155 | A1 | * | 10/2002 | Mertzky ........... F02M 51/06 239/585.1 |
| 2003/0116655 | A1 | * | 6/2003 | Reiter ............... F02M 51/0614 239/585.1 |
| 2005/0046531 | A1 | * | 3/2005 | Moyer ................ F01L 9/04 335/256 |
| 2007/0095954 | A1 | | 5/2007 | Hoffmann et al. |
| 2014/0110508 | A1 | | 4/2014 | Dames et al. |

FOREIGN PATENT DOCUMENTS

| | | |
|---|---|---|
| EP | 1837516 | 9/2007 |
| EP | 1939440 | 7/2008 |
| EP | 2194543 | 6/2010 |
| EP | 1 982 069 B1 | 5/2012 |
| GB | 2208041 | 7/1988 |
| GB | 2213650 | 12/1988 |
| GB | 2466102 | 10/2009 |
| JP | 2003007531 | 1/2003 |
| WO | 2005043266 | 5/2005 |
| WO | 2007/090228 A1 | 8/2007 |

OTHER PUBLICATIONS

Bibliographic Data for document DE 10 2005 030 453 A1, published Jan. 19, 2006, 2 pages.

* cited by examiner

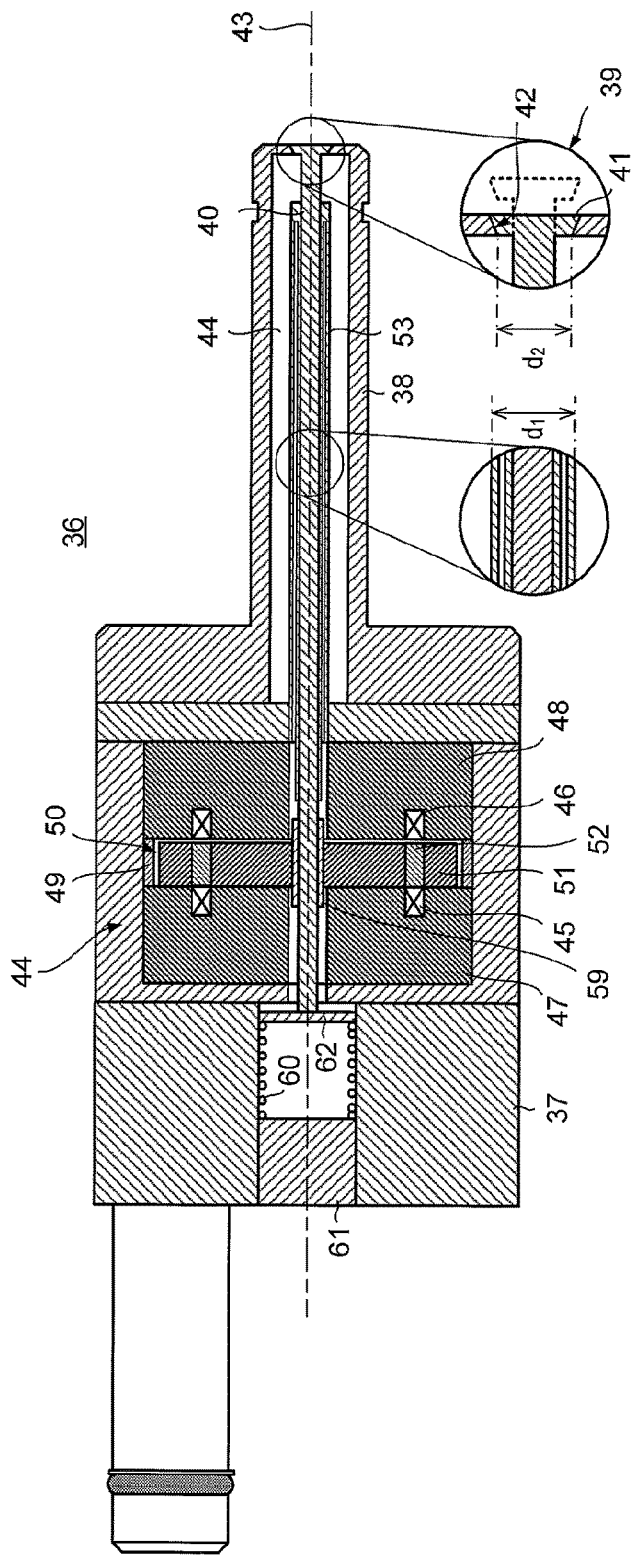
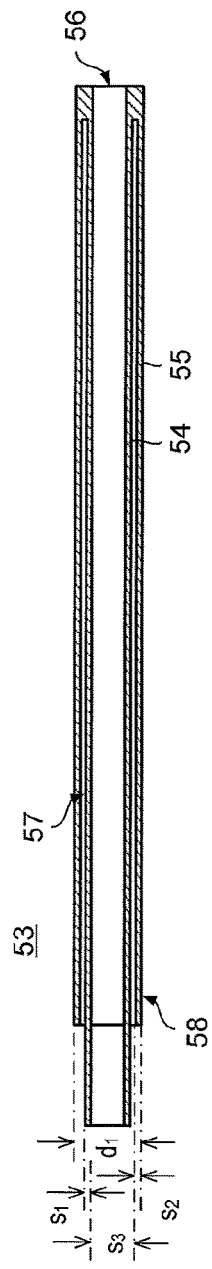
Fig. 7
Fig. 7a

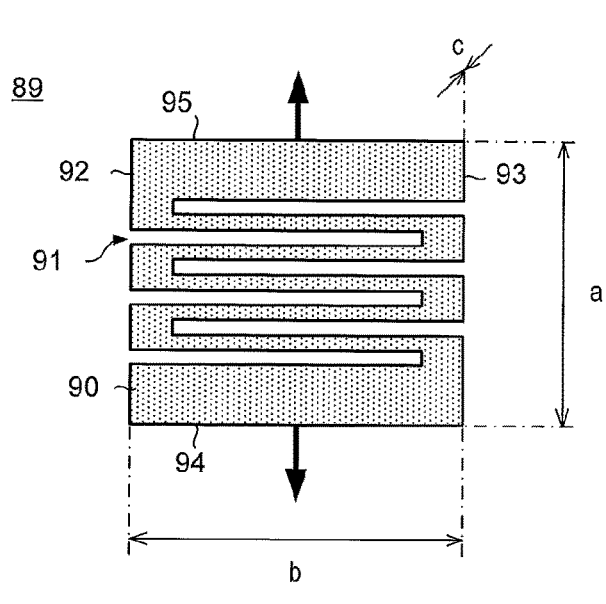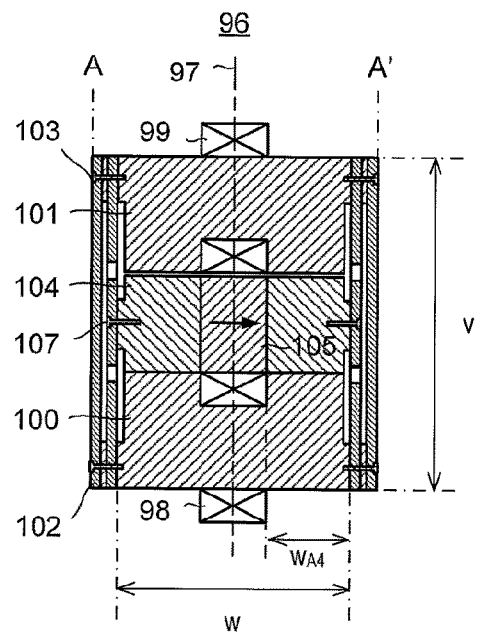
Fig. 13                    Fig. 14
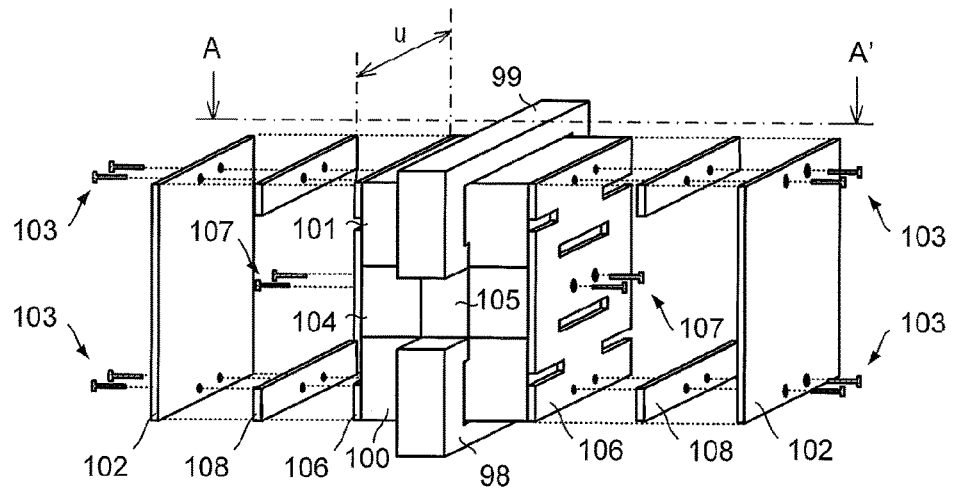
Fig. 14a

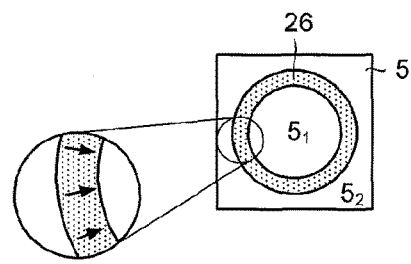 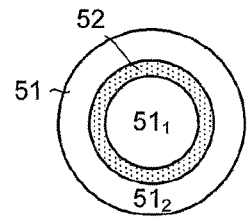
Fig. 15a   Fig. 15b
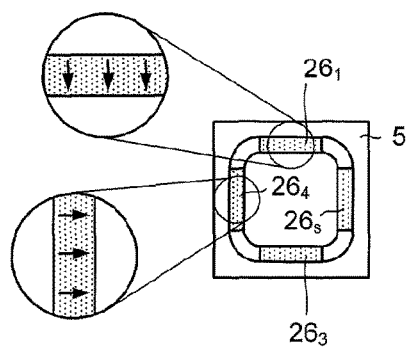 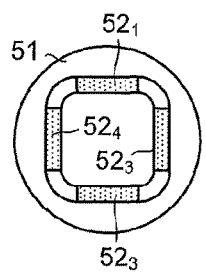 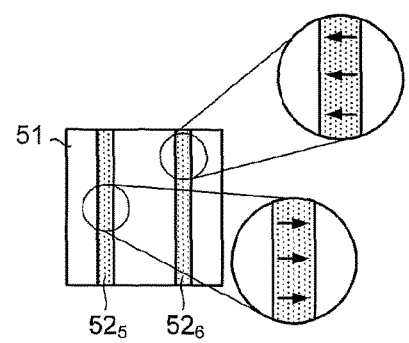
Fig. 16a   Fig. 16b   Fig. 16c
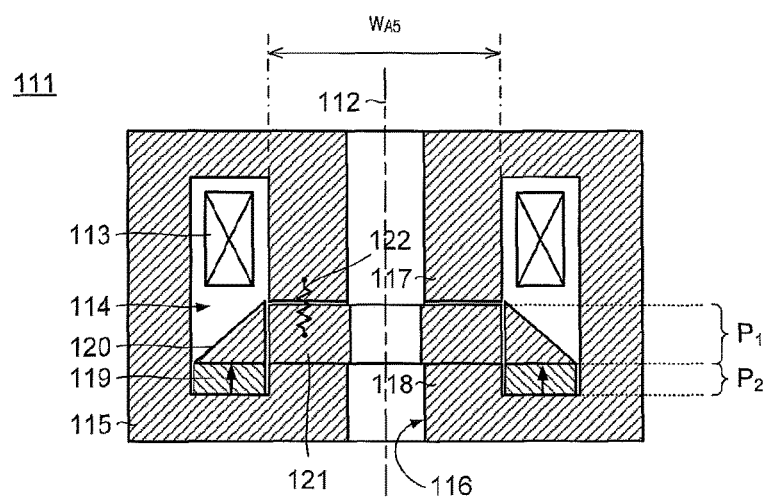
Fig. 17

SOLENOID ACTUATOR

FIELD OF THE INVENTION

The present invention relates to a solenoid actuator particularly, but not exclusively, for use in a fuel injector.

BACKGROUND ART

Solenoids actuators can take many different forms.

A simple single-action solenoid comprises an armature, an electromagnetic coil (often simply referred to as an "electromagnet"), a magnetic core and a spring. Energising the electromagnet causes the armature to move. When the current is switched off, the spring causes the armature to return. Adding a permanent magnet to a single-action solenoid causes the armature to latch. Thus, when the current is switched off, the armature is held in position. To release the armature, the electromagnet is energised with the current flowing in the opposite sense.

A double-action solenoid usually comprises two electromagnets. Dual latching can be achieved by using a permanent magnet, for example, as described in U.S. Pat. No. 4,751,487 A.

In some types of solenoids, the armature is tilted rather than translated linearly. An example of such a solenoid can be found in a balanced armature transducer, such as that described in U.S. Pat. No. 1,365,898 A.

Certain types of solenoid actuators can be used in fuel injectors and engine valves.

For example, US 2007/0095954 A describes a fuel injector having a pintle which is moveable between retracted and extended positions, and a return spring which biases the pintle towards its retracted position. A single-action, non-latching solenoid having an electromagnetic coil and a moveable armature is used to urge the pintle to its extended position. Thus, when the electromagnetic coil is energised, the pintle is urged to its extended position and when the coil ceases to be energised, the pintle returns to its retracted position.

EP 1 837 516 A describes a single-action, non-latching actuator moveable to open and close a fuel valve, a permanent magnet which urges the armature towards a closed position, a spring which urges the armature towards the open position and an electromagnet which produces a magnetic field which interferes with the magnetic field of the permanent magnet which at least reduces the force provided by the permanent magnet on the armature. When the electromagnet is not energised, the permanent magnet exerts a magnetic force to keep the valve in the closed position. When the electromagnet is energised, it creates a magnetic field which reduces the force produced by the permanent magnet. Under the action of the spring, the armature moves to the open position. When the electromagnet is switched off, the force of the permanent magnet closes the valve. Alternatively, the direction of current through the electromagnet may be reversed which helps contribute to the magnetic field closing the valve.

EP 2 194 543 A describes a fuel injector which includes a double-action, non-latching solenoid actuator having an armature, a first electromagnetic coil arranged to move the armature in a first direction, and a spring which helps force the armature in a second direction and retain it in a first (i.e. closed) position. The solenoid actuator also includes a second electromagnetic coil and a permanent magnet associated with the second electromagnetic coil. The permanent magnet produces a magnetic field which acts to move the armature in the second direction and retain the armature in the first position. The second electromagnetic coil generates a magnetic field in the opposite direction to the permanent magnet. Thus, when the second electromagnetic coil is energised, it cancels out the magnetic field of the permanent magnet. At the same time or shortly afterwards, the first electromagnetic coil is energised so as to move the armature in the first direction towards a second position. When the first and second electromagnetic coils cease to be energised, the forces generated by the spring and the permanent magnet act to return the armature back to its first position.

U.S. Pat. No. 5,494,219 A describes a control valve assembly of a fuel injection system having a double-action actuator comprising an armature, first and second coils, and first and second permanent magnets. The armature is held in a first position by the first permanent magnet. The first coil is energised which cancels the magnetic field generated by the first permanent magnet. The second coil is then energised which creates a magnetic field which is in the same direction as the magnetic field generated by the second permanent magnet, thereby pulling the armature towards a second position. The first coil is switched off and, once the armature reaches the second position, the second coil is also switched off. The armature is held in the second position by the second permanent magnet. The process can be repeated, swapping operation of the first and second coils, to return the armature to the first position.

U.S. Pat. No. 5,961,045 A describes a control valve of a fuel injector having a poppet valve member and which includes a single-action solenoid having an armature which includes a permanent magnet and to which the poppet valve member is attached, a coil, and a return spring. Together, the return string and the permanent magnet normally bias the poppet valve member in a first, open position. The permanent magnet is orientated so that when the coil is energised, the permanent magnet pushes away from the coil and flux carrier, pushing the poppet valve into a second, closed position.

EP 1 939 440 A describes a fuel injecting valve having a double-action, dual-latching solenoid which includes a permanent magnet armature arranged between first and second independently-operable coils. The first and second coils are operated to respectively repel and attract the armature and so move a needle valve which is supported by the armature.

Solenoid actuators can also be used to control intake and exhaust valves of a combustion chamber as described, for example, in GB 2 208 041 A (see U.S. Pat. No. 4,779,582 for US counterpart). In this arrangement, a valve closing member is latched into open or closed positions by poles of a permanent magnet against the force of a compressed spring. A coil associated with each position, when activate with a current pulse, cancels the magnetic field of the permanent magnetic poles holding the valve closing member and allows the compressed spring to move the valve closing member quickly through a central neutral position towards the other position.

Another actuator is also described in WO 2005/043266 A and which is used in an ultrafast tool servo. The actuator includes first and second coils, a permanent magnet and an armature supported by flexures.

SUMMARY OF THE INVENTION

The present invention seeks to provide an improved solenoid actuator.

According to a first aspect of certain embodiments of the present invention there is provided a short travel solenoid actuator comprising at least one pole piece, an armature, for example disposed between first and second pole pieces, an electromagnet coil and arranged, in response to energisation, to cause travel of the armature between first and second positions, a permanent magnet positioned and orientated so as to latch the armature in the first and second positions when the armature is in the first and second positions respectively and a spring arranged to bias the armature which provides sufficient force so as to prevent the armature from latching in second position.

The term "short travel" is intended to mean that the armature and pole piece(s) are arranged to have a gap length which is at least an order of magnitude smaller than the narrowest width (or narrowest effective width) of magnetic material adjacent to the gap, i.e. a pole or armature into which or from which magnetic flux flows into the gap. If the gap is made shorter or the magnetic material is made wider, then the magnetic field becomes more uniform across the width of the gap. The width of magnetic material may be at least 10 times, at least 20 times, at least 50 times, at least 100 times, at least 200 times or at least 500 times the maximum gap length. Preferably, the spring has a neutral point, i.e. position at which it exerts no force, at one of or between the first and second positions.

Sufficient force maybe provided by a spring having a sufficiently high spring constant. The latching fields in the first and/or second positions may be between about 1 and 1.5 T. The spring (or if more than one spring is used, then the springs collectively or in combination) may have a spring constant, k (in N/μm) of at least 20 Ncm$^{-2}$×A/t, where A is the active area of a pole piece in cm$^2$ and t is the gap length (in μm). The active area may be the area of the face of the pole piece minus the area taken up by the coil, i.e. the area of the face of magnetic material. The spring may have a spring constant of at least 40 Ncm$^{-2}$×A/t. The area A may be between 0.2 cm$^2$ and 5 cm$^2$. The spring may deliver a spring force having a direction which reverses with travel. The spring may comprise a flexure, such as a flat sheet flexure having a length, width and a thickness, wherein the length is greater than the thickness and wherein the direction of travel lies along the length of the flexure, or concentric tube bellows comprising first and second tubes having a common axis wherein the direction of travel is along the axis.

Length of travel of the armature between first and second positions may be no more than 500 μm, no more than 200 μm or no more than 100 μm. The length of travel may be between 20 and 80 μm.

The permanent magnet may be supported by the armature so as to move with armature. The permanent magnet may be supported by a pole piece. The armature may be flat and have a thickness in a direction of travel of the armature. Thickness of the armature may be at least 1 mm. Thickness of the armature may be between 3 mm and between 5 mm. The permanent magnet may be annular. The actuator may comprise at least two permanent magnets. The actuator may comprise two permanent magnets disposed either side of the centre of the armature and which have radially-orientated (e.g. inwardly-orientated) magnetisations. The actuator may comprise three or more (for example four, six or eight) permanent magnets angularly spaced around the centre of the armature and which have radially-orientated (e.g. inwardly-orientated) magnetisations. The coil may have an annular width no more than 0.1 times the width of the first pole piece.

The actuator may comprise another electromagnetic coil.

According to a second aspect of the present invention there is provided an actuator comprising at least one pole piece, an armature, an electromagnet coil for causing travel of the armature between first and second positions, a permanent magnet configured so as to latch the armature at least in a first position, and a spring arranged to bias the armature.

According to a third aspect of the present invention there is provided a device for controlling fluid flow comprising the actuator.

According to a fourth aspect of the present invention there is provided a fuel injector comprising the actuator.

BRIEF DESCRIPTION OF THE DRAWINGS

Certain embodiments of the present invention will now be described, by way of example, with reference to the accompanying drawings in which:

FIG. 7 is part section of a fuel injector which includes a solenoid actuator in accordance with the present invention including a set of tube bellows;

FIG. 7a is a magnified sectional view of the set of tube bellows shown in FIG. 6;

FIG. 13 illustrates a flat sheet flexure;

FIG. 14 is a section of a solenoid actuator in accordance with the present invention;

FIG. 14a is an exploded, perspective view of the actuator shown in FIG. 14;

FIG. 15a is a plan view of an annular permanent magnet set in a rectangular armature;

FIG. 15b is a plan view of an annular permanent magnet set in a circular armature;

FIG. 16a is a plan view of a set of rectangular magnet in a rectangular armature;

FIG. 16b is a plan view of a set of rectangular magnet in a circular armature;

FIG. 16c shows an example which comprises two bar magnets extending across the armature.

FIG. 17 is a sectional view of an out-of-plane permanent magnet arrangement;

DETAILED DESCRIPTION OF CERTAIN EMBODIMENTS

Figure 1:
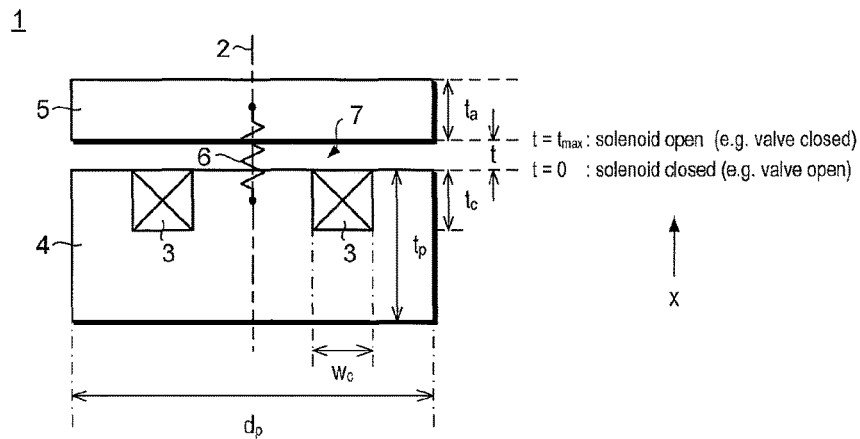
FIG. 1 is a schematic diagram of a single-acting solenoid actuator with a stiff spring.

Before describing certain embodiments of the invention in detail, operation of single-action solenoid actuators will first be described which may be useful for understanding the present invention. In the following description of the operation of solenoid actuators, like parts are denoted by like reference numerals.

Referring to FIG. 1, a single-acting solenoid actuator 1 is shown. The actuator 1 has an axis 2 and comprises an electromagnetic coil 3 wound around the axis 2, a pole piece 4 associated with the coil 3, an armature 5 axially spaced apart from the pole piece 4 and a compression spring 6 having a spring constant. An air gap 7 having a gap size, t, is formed between the pole piece 4 and armature 5.

The pole piece 4 takes the form of an E-core. The pole piece 4 and armature 5 are generally rectangular in plan view.

The actuator 1 may be used in a fuel injector (not shown) in which a valve head (not shown) is retracted, along a negative x direction, to unseat it from a valve seat (not shown) and so open the valve. However, the actuator 1 may be used in a fuel injector (not shown) in which a valve head (not shown) is extended, along a positive x direction, to unseat it from the valve seat (not shown)

FIG. 1 shows the actuator 1 in a fully open position, i.e. $t=t_{max}$, without the electromagnetic coil 3 energised, and which is the maximum displacement at which the valve is still held closed by the spring. The electromagnetic coil 3 can be used to close the air gap 7, i.e. $t=0$, by energising the coil 3 with current flowing in a suitable direction. When closed, the force, $F_S$, exerted by the spring 6 equals the maximum magnetic closing force, $F_m(max)$.

For a small gap length compared with pole width, $t \ll w_2$ and $t \ll w_1$, the maximum magnetic closing force, $F_m(max)$, can be approximated as:

$$F_m(max) = A \times 0.5 \; B \cdot H \quad (1)$$

where A is the area of the pole 4 (in this case $A = 0.25 \times \pi d_p^2 - A_{coil}$, where $A_{coil}$ is the area of the coil), B is the magnetic field (magnetic flux density) and H is the magnetic field intensity for a maximum saturating field. The magnetic closing force, $F_m(max)$, approximately equals $A \times 400,000 \; B^2$. Thus, assuming the maximum saturating field for iron is 2 Tesla, the maximum magnetic closing force, $F_m(max)$, is about 160 Ncm$^{-2}$ for an iron pole piece 4 and armature 5. The magnetic closing force is about 100 Ncm$^{-2}$ for 1.6 Tesla. For a small gap length, $F_m$ is approximately constant with travel.

In this example, the pole piece 4 and armature 5 are generally square in plan view (viewed along the x-axis), and $t_{max}$ is 50 μm, the armature thickness, $t_a$, is 4 mm, the pole piece thickness, $t_p$, is 5.2 mm, the coil thickness, $t_c$, is 1.2 mm, the pole piece width, $d_p$, is 14.4 mm, and the coil annular width, $w_c$, is 1.2 mm. Thus, in this case, the minimum pole width, $w_2$ is 3 mm and $w_2/t$ is 60.

When the actuator 1 is fully open, the coil 3 can carry a maximum current, $I_{max}$, before the magnetic field B in the pole piece 4 saturates. The coil 3 can be shorted fixing the magnetic flux linked with coil 3.

Figure 2A:
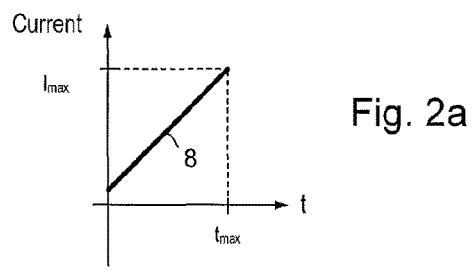
FIG. 2a shows dependence of saturating coil current on armature position of the actuator shown in FIG. 1.

FIG. 2a shows a plot 8 of saturating current against armature position. As shown in FIG. 2a, as the armature 5 is brought towards the pole 4, the saturating current in the coil 3 reduces linearly.

Figures 2B, 2C, 2D:
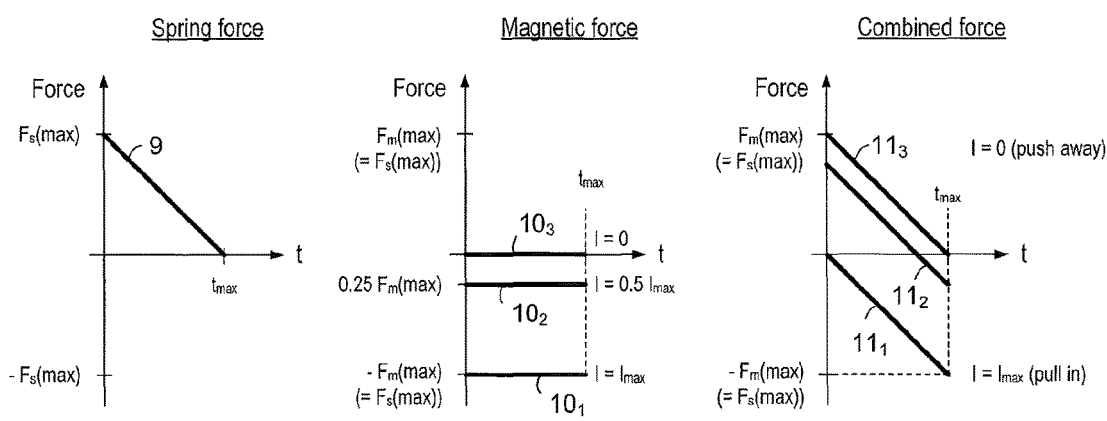
FIG. 2b shows a spring characteristic of the actuator shown in FIG. 1.
FIG. 2c shows a magnetic force characteristic at constant flux of the actuator shown in FIG. 1.
FIG. 2d shows combined force characteristic of the actuator shown in FIG. 1.

Referring also to FIG. 2b, a plot 9 of spring force, $F_S$, against armature position is shown. As shown in FIG. 2b, maximum spring force is exerted when the actuator 1 is closed, i.e. when $t=0$. As the gap size, t, increases, the spring force, $F_S$, decreases linearly, reaching zero when the spring 6 is uncompressed and the gap size, t, is at a maximum, i.e. when $t=t_{max}$. In operation as a valve, the valve would seat before $t_{max}$, ensuring a closing force remains.

Referring also to FIG. 2c, first, second and third plots $10_1$, $10_2$, $10_3$ of magnetic force for three different values of current, namely $I=I_{max}$, $I=0.5_{max}$ and $I=0$ respectively, against armature position are shown. As shown in FIG. 2c, the magnetic force for a given current remains constant with armature position.

Behaviour of the solenoid actuator 1 can be explained by considering magnetic energy $E_m$.

The magnetic energy, $E_m$, stored in the actuator 1 can be calculated by taking the integral of 0.5 B·H over volume. For an actuator using an ideal soft material and a small gap, all of the magnetic energy is stored in gap 7. For a small gap, the magnetic field is uniform. The volume, V, of the gap 7 can be calculated as $V = A \times t$. Thus, the magnetic energy, $E_m$, stored in the gap 7 can be calculated as:

$$E_m A \times t \times 0.5 \; B \cdot H. \quad (2)$$

Using $F = A \times 0.5 \; B \cdot H$, this can be re-expressed as:

$$E_m = F_m \times t \quad (2')$$

where F is the generated force.

Thus, if an electrical potential difference, V, is applied across the ends of the coil 3 and current, I, is allowed to build up in the coil 3, then amount of magnetic energy stored, $E_m$, can be expressed as:

$$E_m = 0.5 L \times I^2 \quad (3)$$

where L is the inductance of the coil 3. If the coil 3 is then short-circuited, the magnetic flux linked with the coil is fixed in the short term (until the magnetic energy is dissipated due to the resistance of the coil). As the armature 5 moves down, reducing the gap, this energy is then transformed into kinetic energy and work done by the actuator 1.

The magnetic force at different fractions of magnetic saturation as a function of armature position is shown in FIG. 2c. For a given flux, the magnetic force is constant. However, as shown in FIG. 2a, an increasing amount of current is needed as the gap is increased.

FIG. 2d shows plots $11_1$, $11_2$, $11_3$ of combined spring and magnetic force against position when the coil 3 is prepared in three states, namely a first in which a current, $I_{max}$, varying with position (as seen in FIG. 2a) resulting in a maximum saturating magnetic field, $B_{max}$, is applied, a second in which half this current is applied and a third in which the coil is open circuit (and, thus, no current flows in the coil).

In a condition where $B=B_{max}$, the current, I, in the coil 3 reduces linearly with gap size, t, (as shown in FIG. 2a) while the inductance, L, increases linearly with gap size, t. According to equation 3 above, the stored magnetic energy, E, reduces linearly with gap size, t, and, according to equation 2' above, the magnetic force remains constant. The total work, W, done can be expressed as:

$$W = E_m(t=t_{max})/t_{max} \times \Delta t \quad (4)$$

where $\Delta t$ is the change in gap size. Clearly, if the gap size, t, is changed from being the maximum gap size (i.e. $t=t_{max}$) to zero gap size (i.e. t=0), then $\Delta t=t_{max}$ and W=E. Thus, at zero gap size, flux and magnetic force are still the same, but current, I, and stored magnetic energy, $E_m$, are now zero.

Thus, as shown in FIG. 2c, if the coil 3 is prepared with no current, then it does not contribute any force and so the spring 6 tends to oppose closure of the gap 7, i.e. it pushes away the armature 5. However, if the pole is prepared with maximum flux, then it contributes a constant magnetic force. This force offset means that the resulting net force pulls the armature 5 towards the pole piece 4.

Figure 3:
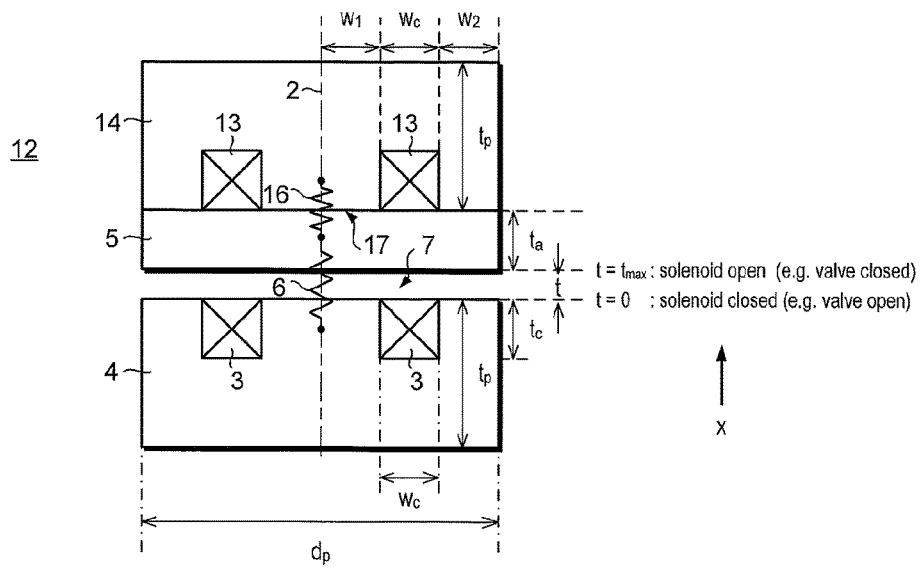
FIG. 3 is a schematic diagram of an actuator comprising first and second back-to-back single-acting actuators.

Referring to FIG. 3, a double-action, back-to-back solenoid actuator 12. Similar to the single-acting solenoid actuator 1 shown in FIG. 1, the back-to-back solenoid actuator 12 has an axis 2 and comprises a first electromagnetic coil 3 wound around the axis 2, a first pole piece 4 associated with the first coil 3, an armature 5 axially spaced apart from the first pole piece 4 and a first compression spring 6 having a spring constant, k. A first air gap 7 having a gap size, t, is formed between the first pole piece 4 and armature 5. The actuator 12 has the same dimensions as the single-acting solenoid actuator 1 shown in FIG. 1.

The actuator 12 includes a second electromagnetic coil 13 wound around the axis 2, a second pole piece 14 associated with the second electromagnetic coil 13 and a second compression spring 16 having a spring constant. In this example, the spring constants are the same. A second air gap 17 having a gap size, u, is formed between the second pole piece 14 and the armature 5. In this example, $u=t_{max}-t$. Thus, when $t=t_{max}$, u=0 and when t=0, $u=t_{max}$.

Thus, the actuator 12 can be considered as a pair of back-to-back single-action actuators 1, with axially spaced coils 3, 13, and which share a common armature 5.

The pole pieces 4, 14 each take the form of an E-core and are generally rectangular in plan view.

Figure 4A:
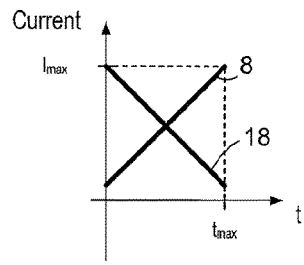
FIG. 4a shows dependence of saturating coil currents on armature position of the actuator shown in FIG. 3.

FIG. 4a shows plots 8, 18 of current in the first and second coils 3, 13 respectively against armature position. Current flow in the first and second coils 3, 13 are in same directions. As shown in FIG. 4a, as the armature 5 is brought towards the first pole piece 4 (the lower pole as shown), the value of current in the first coil 3 needed to saturate the poles in the second pole piece 14 reduces linearly, whereas the value of current in the second coil 13 need to saturate the poles in the first pole piece 4 increases linearly.

Figure 4B:
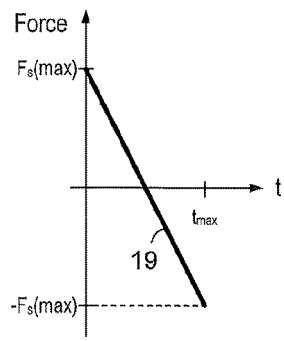
FIG. 4b shows spring characteristics for the actuator shown in FIG. 3.
Figure 4C:
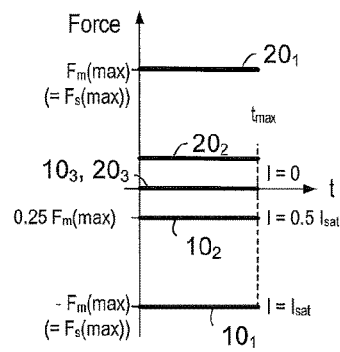
FIG. 4c shows magnetic force characteristics for the actuator shown in FIG. 3.

Referring also to FIGS. 4b and 4c, plots 9, 19 of spring force, $F_S$, against position and plots $10_1$, $10_2$, $10_3$, $20_1$, $20_2$, $20_3$ of magnetic force for three different values of current, namely $I=I_{sat}$, $I=0.5_{sat}$, and I=0 respectively, for the first and second coils 3, 13 against armature position are shown. $I_{sat}$ is a function of armature position (see FIG. 4a).

As shown in FIG. 4b, maximum spring force is exerted by the second spring 16 when the first gap 7 is open and the second gap 17 is closed, i.e. $t=t_{max}$.

As shown in FIG. 4c, if the coils 3, 13 are prepared using half the maximum saturated current value, then the closing forces $10_2$, $20_2$ are reduced to a quarter since force is proportional to the square of the current.

Figure 4D:
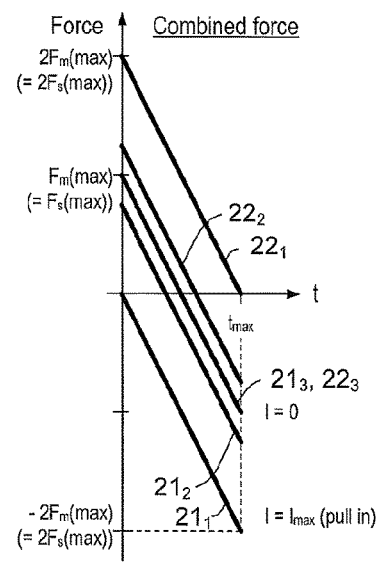
FIG. 4d shows combined spring and magnetic force characteristics for the actuator shown in FIG. 3.

Referring also to FIG. 4d, the spring forces, $F_s$, $F'_s$, of the first and second springs 6, 16 and the magnetic forces add to produce a combined spring force characteristics $21_1$, $21_2$, $21_3$, $22_1$, $22_2$, $22_3$.

As shown in FIG. 4d, if the coils 3, 13 are prepared without any current (i.e. I=0), then the actuator 12 exhibits force characteristic $21_3$, $22_3$ at which there is zero net force when the armature 12 is positioned midway between the pole pieces 4, 14.

Two electromagnetic coils 3, 13 can be used to double the magnetic energy of the solenoid actuator 12 of the single-acting solenoid 1 shown in FIG. 1. Thus, the solenoid actuator 12 can exert double the force and, thus lead to quicker actuation of the armature 5, as the same size of armature can be used in both devices. Notwithstanding this, the actuator 12 shown in FIG. 3 still behaves effectively as two separate actuators. With the springs forces as shown in FIG. 4d, current is supplied to keep the actuator in a closed state, i.e. t=0.

The present invention is based, at least in part, on the insight that the same or similar performance as the back-to-back actuator can be achieved, but more efficiently and in a way that allows the actuator to be pulled into the closed actuator state without power.

Figure 5:
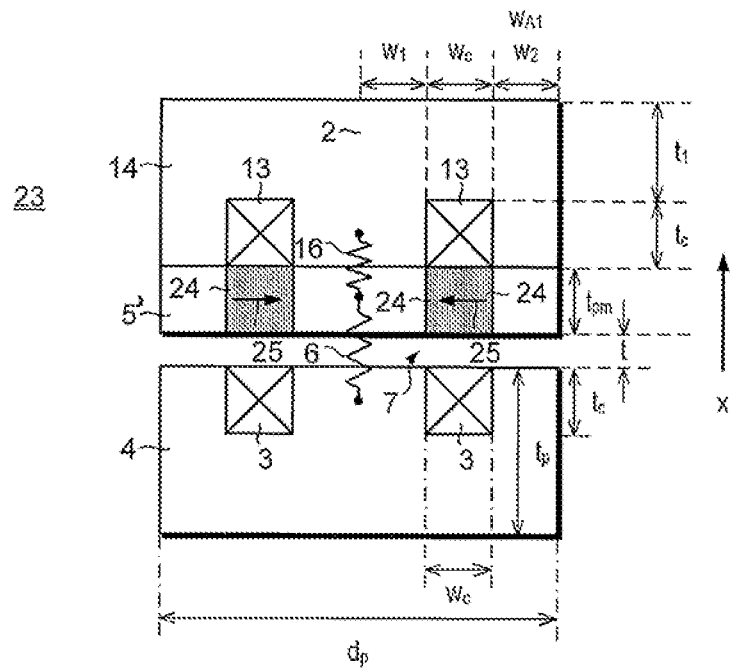
FIG. 5 is a schematic diagram of a solenoid actuator in accordance with the present invention.
Figure 5A:
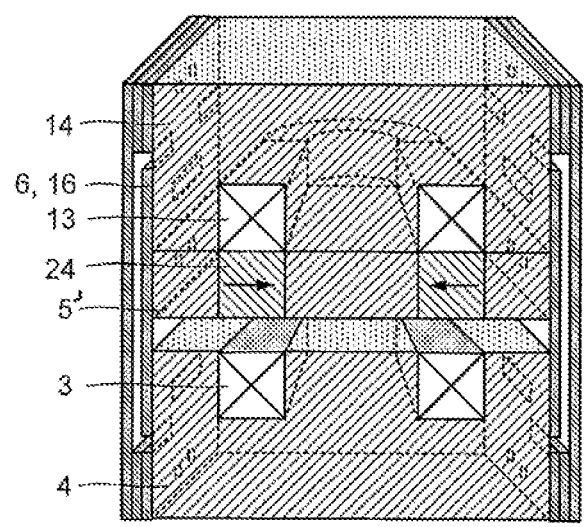
FIG. 5a is a perspective section of the solenoid actuator shown in FIG. 5.

Referring to FIGS. 5 and 5a, a solenoid actuator 23 in accordance with the present invention is shown. The solenoid actuator 23 has a modified armature 5' which includes two permanent magnets 24 having inwardly-orientated magnetisations 25. The actuator 23 has the same dimensions as the actuator 12 shown in FIG. 3.

As shown in FIG. 5, $w_1=w_2=3$ mm, the armature thickness, $t_a$, is the same as the permanent magnet thickness, $t_{pm}$, which is about 4 mm and $t_1=4$ mm. The actuator 23 operates with 270 amp-turns (2×15 A×9 turns) for two coils 3, 13. However, the amp-turns can be lower or higher, for example between 50 and 500 amp-turns per actuator. The coils comprise 0.25 mm diameter wire.

In this example, the actuator 23 is square in plan view, i.e. viewed along the x-axis. The springs 6, 16 take the form of a pair of flat flexures attached to the armature 5 and to the pole pieces 4, 14 on opposite sides so that the armature 5 and pole pieces 4, 14 are sandwiched between the flexures.

Figure 6A:
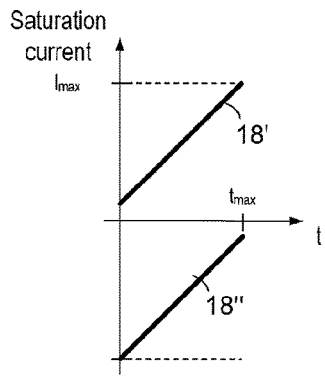
FIG. 6a shows dependence of saturating coil current on armature position of the actuator shown in FIG. 5.

Referring to FIG. 6a, current, I, is the sum of the current in the two coils since they are closely coupled. Line 18' shows the maximum positive current, limited by saturation of the lower pole. Line 18" shows the maximum negative current, limited by saturation of the upper pole.

Figure 6B:
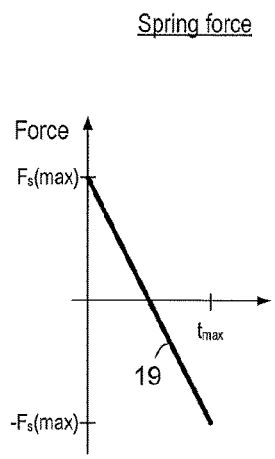
FIG. 6b shows spring characteristics of the actuator shown in FIG. 5.

As shown in FIG. 6b, the springs 6, 16 have the same characteristics 9, 19 as the actuator 12 (FIG. 3) without an armature magnet 24.

Figure 6C:
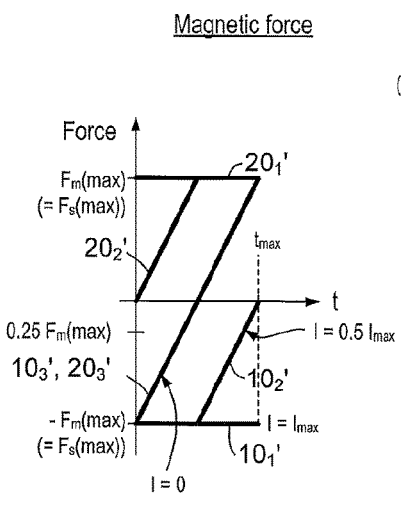
FIG. 6c shows magnetic force characteristics of the actuator shown in FIG. 5.

However, as shown in FIG. 6c, the effect of the permanent magnet 24 is to introduce a position-dependent magnetic force when the magnetic fields in the pole pieces 4, 14 are not saturated. Thus, the maximum magnetic forces are the same as those for the actuator 12 (FIG. 3) without an armature magnet 23. However, the currents needed to achieve them are different.

Figure 6D:
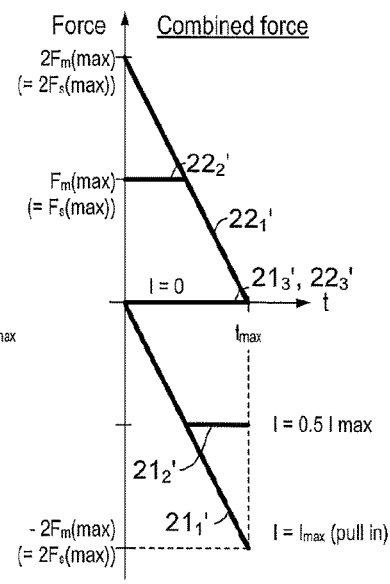
FIG. 6d shows combined force characteristic of the actuator shown in FIG. 5.

FIG. 6d show corresponding plots $20_1'$, $21_2'$, $21_3'$, $22_1'$, $22_2'$, $22_3'$ of combined spring and magnetic forces.

As can be seen from comparing the combined force characteristics $21_1$, $21_1'$ in FIGS. 4d and 6d for saturated fields, placing the permanent magnet 24 in the armature 5' does not affect the maximum force which can be delivered by the actuator 23. However, the permanent magnet 24 significantly alters the drive requirements, particularly at lower fields.

As can be seen from FIG. 6c, the armature 5' is subject to a negative spring effect, i.e. as the armature 5' is brought closer to a pole piece 4, 14, magnetic force at zero current increases. Thus, without the springs 6, 16, the armature 5' tends to latch at t=0 and $t=t_{max}$. However, as can be seen from FIG. 6d, the springs 6, 16 have the effect of compensating for this effect. If the spring constants and negative spring constants are matched, then the forces can be balanced. Furthermore, one or both spring constants can be increased further so that they exceed the negative spring constants, producing an actuator that is stable in the centre, or at one or other end, which is normally the closed position for a relay, valve or injector.

Figure 6E:
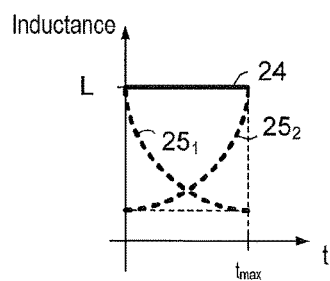
FIG. 6e shows behaviour of inductance with armature position for the actuator shown in FIGS. 3 and 5.

As shown in FIG. 6e, the first and second coils 3, 13 are closely coupled electrically, and for small gaps (i.e. t<<d), can be considered to be a single coil. As the flux from the coils pass through both upper and lower gaps in series, the inductance 24 of the armature 5' effectively remains constant with position. However, the inductance $25_1$ of the coil 3 (FIGS. 1 & 3) without a permanent magnet quickly decreases as they are separated with a corresponding increase in the inductance $25_2$ of coil 13 (FIG. 3).

As both coils are coupled to the gaps, current can be shared between them (for example, by connecting them in series). Thus, the actuator 23 can operate more efficiently as copper losses are lower. By using a suitably-orientated permanent magnet, particularly when the length of travel is short, the actuator 23 can operate using flux switching.

As shown in FIG. 5, an embodiment is shown based on two E cores. However, different numbers, shapes and configurations of pole pieces can be used. At least one pole piece is arranged to form a gap in which the armature sits and can travel. For example, the gap may be provided between first and second pole pieces, for instance, first and second E-cores or C-cores. However, the gap may be provided between poles of a single pole piece or multipart pole piece, for example a C-core. The pole piece(s), armature and the permanent magnet(s) are arranged to form two different magnetic paths (but which may share sections of magnet material, such as the armature and/or sections of a pole piece) when the armature is in different positions at (or close to) opposite ends of travel, when the armature comes into contact with a pole piece.

Embodiments of the present invention can provide short-travel, flux-switched actuators which can be used in high-acceleration, start-stop applications, such as in fuel injectors. Such actuators have potentially better performance than a correspondingly-sized piezoelectric actuator. In some embodiments, an actuator can deliver a force of up to 200 N and/or can have a typical stroke of about 50 μm. In some embodiments, the actuator can have opening and/or closing time of about 0.2 ms and potential opening and/or closing time of 50 μs. The delay between multiple injection events can be less than 0.2 ms. In some embodiments, a fuel injector including an actuator can have similar power requirements to and/or can have a similar size as a conventional gasoline direct injection (GDI) actuator. There is a potential for zero return flow in the injector. Also, the actuators provide linear actuation which enables variable valve lift.

Further embodiments of the present invention will now be described. In the following description, like parts are denoted by like reference numerals.

Referring to FIG. 7, a fuel injector 36 for use in an internal combustion engine is shown.

The fuel injector 36 comprises a multipart injector housing 37 including a nozzle section 38 having a spray aperture 39 at its distal end. A pintle 40 extends through the nozzle section 38 and has a head 41. The pintle head 41 is engageable with a valve seat 42.

The pintle 40 is moveable within the injector housing 37 between a first, retracted position and a second, extended position along an axis 43. In the retracted position, the pintle head 41 mates with the valve seat 42. In the extended position, the pintle head 41 disengages from the valve seat 42 to inject fuel from a high pressure fuel chamber 44.

The fuel injector 36 includes an actuator 44 in accordance with the present invention which is flux switched and which is operable to cause the pintle 40 to reciprocate linearly between retracted and extended positions.

The actuator 44 comprises first and second electromagnetic coils 45, 46 wound around the axis 43, first and second pole pieces 47, 48 associated with the first and second electromagnetic coils 45, 46 respectively, separated by a ring 49 and forming a disc-shaped space 50, a disc-shaped armature 51 which includes a coaxial annular permanent magnet 52, and a stiff spring 53, i.e. a spring having a high spring constant, k. The stiff spring 53 takes the form of a set of concentric tube bellows formed from high tensile stainless steel.

As shown in more detail in FIG. 7a, the tube bellows 53 comprise inner and outer bellows 54, 55 attached at a distal end 56. The inner bellow 54 is longer than the outer bellow 55. A proximal end 57 of the inner bellow 54 is attached to the pintle 40 and the proximal end 58 of the outer bellow 55 is attached to the injector housing 37. The pintle 40 is attached to the armature 51 via a tubular sleeve 59.

The force exerted by the tube bellows 53 is balanced by matching the diameter, $d_1$ of the bellows 54, 55 to the diameter of the valve seat 52, corrected for Poisson ratio, to the diameter, $s_3$, of the orifice, providing dry actuation and avoids fuel return flow from the injector. The diameter, $d_1$, of the outer tube bellow 55 is approximately 1.4 times the diameter, $d_2$, of the valve seat 42.

The tube bellows 53 provide sufficient force to prevent latching of the pintle 40 in the extended position. A helical compression spring 60 is axially disposed between a calibration pin 61 and a plate 62 which abuts the end of the pintle 40. Thus, the pin 61 can be used to trim the injector 36.

As will be explained in more detail later, one of the electromagnetic coils 45, 46 can be omitted and yet still permit double action, for example by changing the direction of drive current.

The actuator 44 provides linear operation, with high electromechanical coupling, and proportional control via back emf sensing. A separate flux measurement loop (not shown) can be used to provide further control, for example, as described in WO 2005/043266 A ibid. This can be used to control accurately partial opening of the injector 36 and suppress bounce by slowing the armature before contact with end stops, such as the pole pieces 47, 48.

Electromechanical coupling can be increased by using a permanent magnet suitably-positioned with respect to the magnetic circuit, for example as shown in FIG. 5 or FIG. 7, by increasing the ratio $(t_{pm}+t_{max})/t_{max}$, where $t_{pm}$ is the thickness of the permanent magnet and $t_{max}$ is the gap size, and by arranging the reluctance of the path taken by magnetic flux around the coil to be much less than the reluctance of the gap.

As explained earlier, less amp-turns can be used (for example, compared to an actuator without the permanent magnet and/or an actuator which is not a short-travel actuator) since magnetic flux from the permanent magnet 42 adds to the magnetic flux from coil(s) 45, 46. Thus, small coils can be used.

The permanent magnet 52 may comprise an EH grade NdBFe magnet and the pole pieces 47, 48 may comprise high-resistivity sintered iron, for example AncorLam™ marketed by Hoeganaes Corporation, Cinnaminson, N.J., USA.

In FIG. 7, the actuator 44 is shown having a smaller diameter than the housing 37. However, the difference may be much smaller. The housing 37 does not provide a magnetic return path. In some embodiments, the housing 37 does not circumferentially encase the actuator 44.

Figure 8:
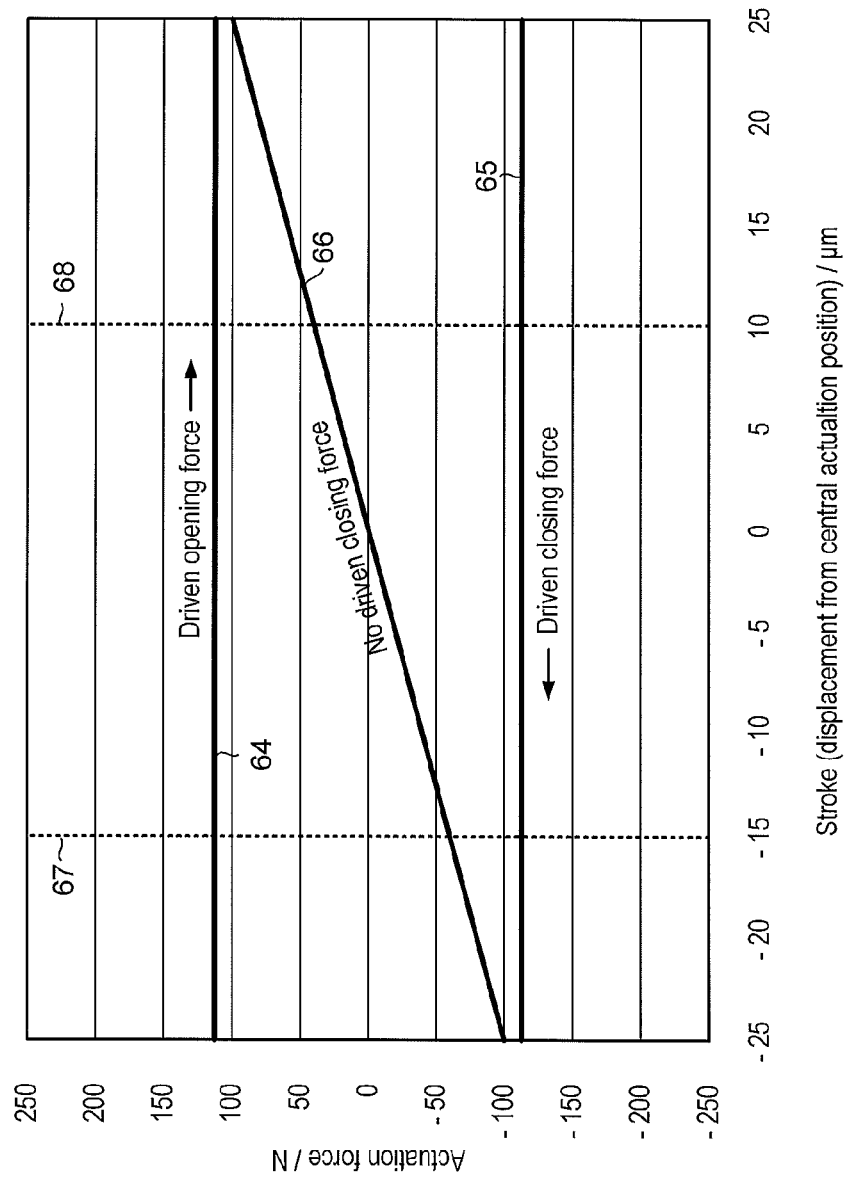
FIG. 8 shows plots of force against stroke for the solenoid actuator shown in FIG. 7 without the set of tube bellows.

Referring also to FIG. 8, plots 64, 65, 66 of force against stroke are shown which illustrate the modelled performance of the actuator 44 without the tube bellows 53.

First and second plots 64, 65 show the maximum saturated magnetic driving forces which can be used to move the armature 51 between first and second positions 67, 68 corresponding to closed and open positions respectively. The position of the armature 51 midway between the poles is used as a reference point, i.e. stroke is 0 μm. In this example, the closed and open positions 67, 68 are −15 μm and +10 μm. The closed position 67 allows 10 μm of margin to ensure that the valve seats before contact between the armature 51 and pole piece 47. The open position 68 allows for variable valve lift. Alternatively, the valve may be fully opened when it reaches the pole piece at +25 μm. As shown in FIG. 7, the maximum saturated opening and closing forces are substantially constant with position, each having a magnitude of about 120 N.

A third plot 66 shows the magnetic force on the armature 51 against position at zero current.

Figure 9:
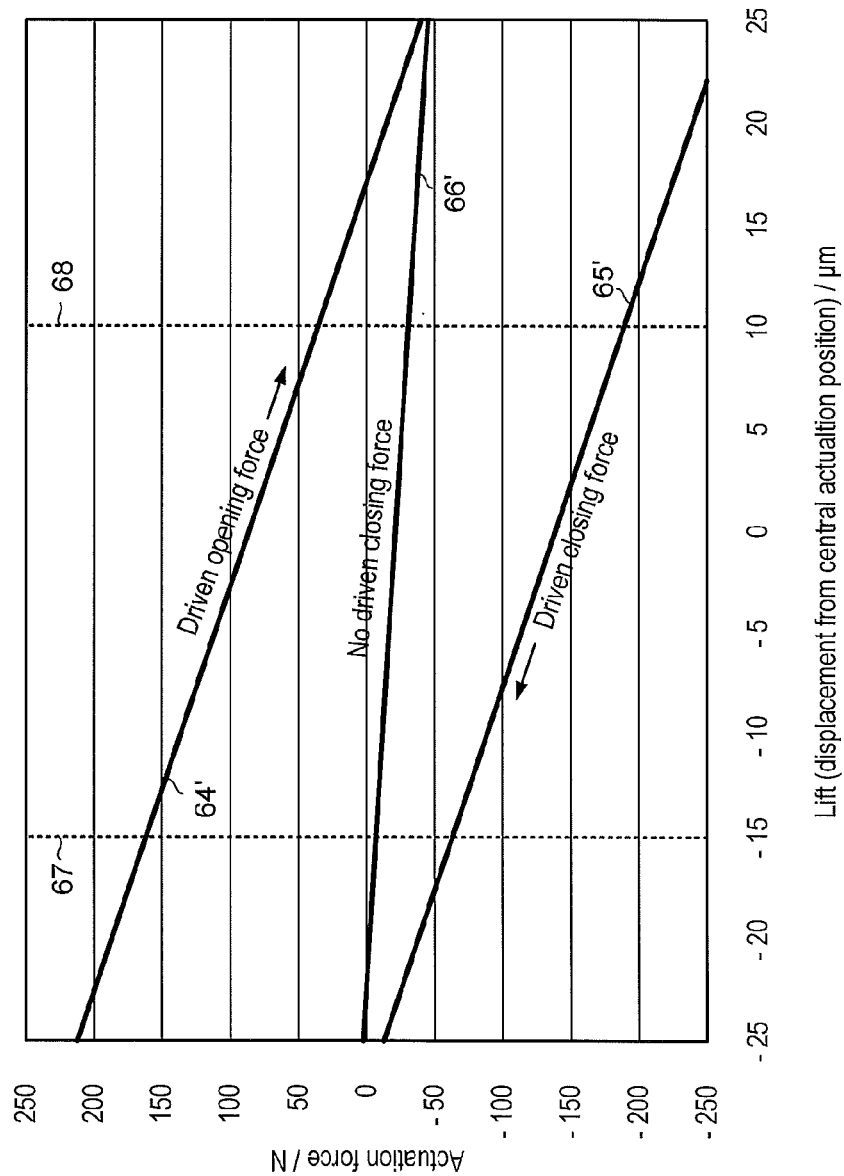
FIG. 9 shows plots of force against stroke for the solenoid actuator shown in FIG. 7 with the set of tube bellows.

Referring to also to FIG. 9, plots 64', 65', 66' of force against stroke are shown which illustrate the modelled performance of the actuator 44 with the tube bellows 53.

The effect of the tube bellows 53 is to tilt the plots 64, 65, 66 shown in FIG. 7 by the spring constant, k, of the tube bellow 63, i.e. by about 5 Nμm$^{-1}$.

Figure 10:
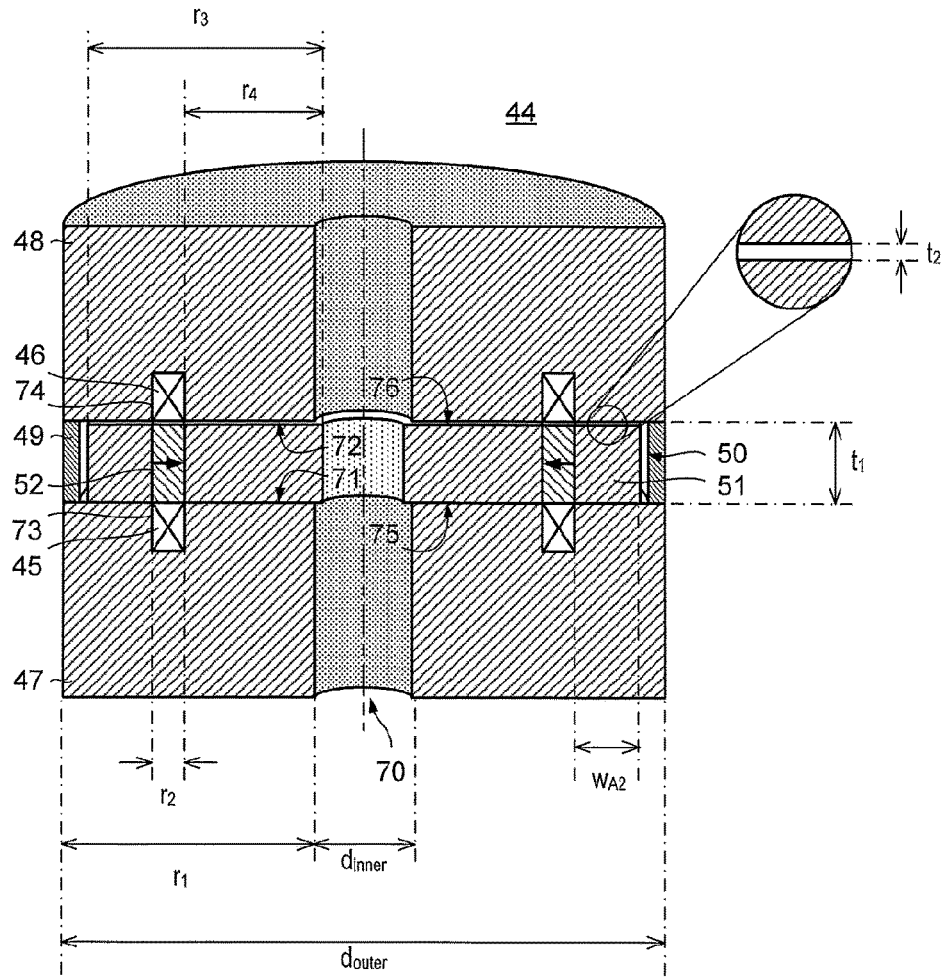
FIG. 10 is a perspective section of the solenoid actuator shown in FIG. 7.

Referring to FIG. 10, the actuator 44 without tube bellow 53 (FIG. 7) is shown in more detail.

As shown in FIG. 10, the first and second pole pieces 47, 48 (which may be referred to as upper and lower pole pieces respectively) are generally annular in shape having an outer diameter $d_{outer}$ and an inner diameter $d_{inner}$. The first and second pole pieces 47, 48 have opposing faces 71, 72 (shown in FIG. 10 as upper and lower faces respectively) having respective annular recesses 73, 74 which retain the coils 45, 46. The armature 51 has first and second faces 75, 76 (shown in FIG. 10 as lower and upper faces respectively). The armature 51 sits between the pole pieces 47, 48 and so the first and second faces 75, 76 of the armature 51 face the faces 71, 72 respectively. In this example, the actuator 44 operates with 270 amp-turns (2×15 A×9 turns) for two coils 45, 46. However, the amp-turns can be lower or higher, for example between 50 and 500 amp-turns per actuator.

Figure 10A:
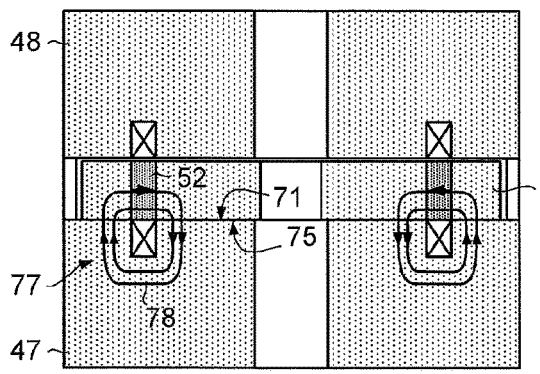
FIG. 10a illustrates a first magnetic circuit when the armature of the solenoid actuator in FIG. 10 is in a first position.

Referring to FIG. 10a, when the armature 51 is in a first position in which the first face 75 of the armature 51 abuts the face 71 of the first pole piece 47, the permanent magnet 52 produces a magnetic field in a first magnetic circuit 77. As shown in FIG. 10a, flux lines 78 pass radially through the armature magnet 52 and the armature 51, into the first pole piece 47, around the coil 46 and back into the armature 51. In this example, the narrowest width of magnetic material is an outer portion of the armature and has a width, $w_{A2}$.

Figure 10B:
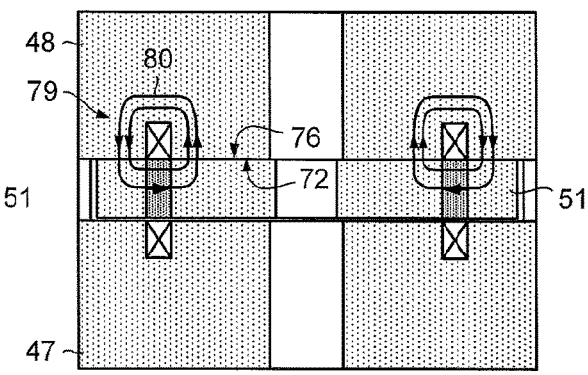
FIG. 10b illustrates a second magnetic circuit when the armature of the solenoid actuator in FIG. 10 is in a second position.

Referring to FIG. 10b, when the armature 51 is in a second position in which the second face 76 of the armature 51 abuts the face 72 of the second pole piece 48, the permanent magnet 52 produces a magnetic field in a second magnetic circuit 79. As shown in FIG. 10a, flux lines 80 pass radially through the armature magnet 52 and the armature 51, into the second pole piece 48, around the coil 47 and back into the armature 51.

As explained earlier, two sets of windings 45, 46, i.e. electromagnetic coils, need not be used.

The solenoid actuator 44 has a short travel. In other words, the pole pieces 47, 48 and armature are arranged such that the maximum distance which the armature 51 can travel, which in this case can be seen to be the maximum gap, $t_2$, formed between a pole piece 47, 48 and the armature 51, is much smaller than the narrowest width of magnetic material, $W_{A2}$. Under these circumstances, the gap between the armature and pole piece is small and so the magnetic field in the gap is uniform.

The maximum gap length is at least an order of magnitude smaller than the narrowest width of magnetic material, $w_{A2}$, i.e. $w_{A2} > 10\ t_2$. In this example, the gap is about 50 μm and the active width is about 2 mm.

Figure 11:
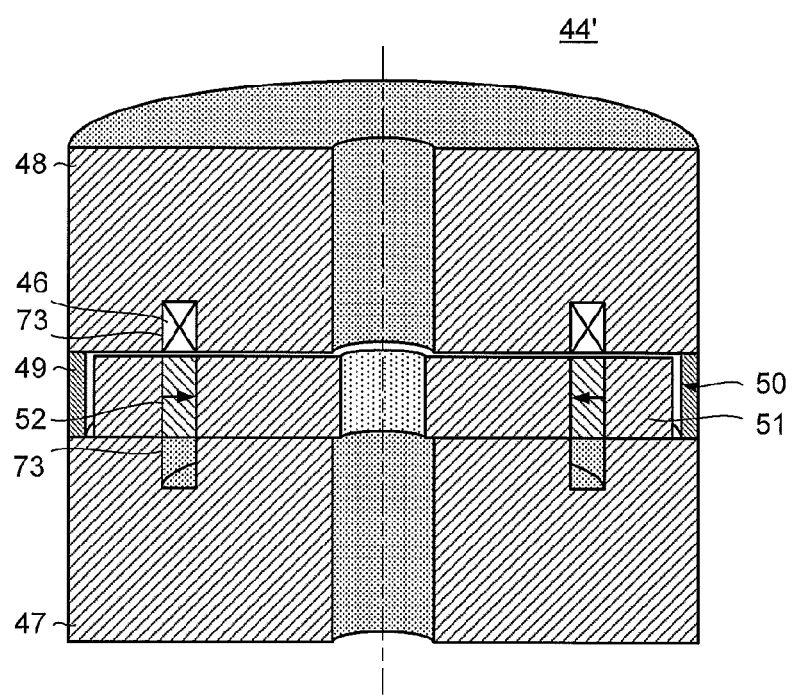
FIG. 11 is a perspective section of another solenoid actuator in accordance with the present invention.

Referring to FIG. 11, another actuator 44' is shown. The actuator 44' is the same as the actuator 44 shown in FIG. 10, but does not have a first electromagnetic coil 45. The recess 73 may likewise be omitted. In some other embodiments, the second electromagnetic coil 46 may be omitted.

In the examples described earlier, an armature magnet is used. However, a fixed pole magnet which does not move with the armature may be used instead.

Figure 12:
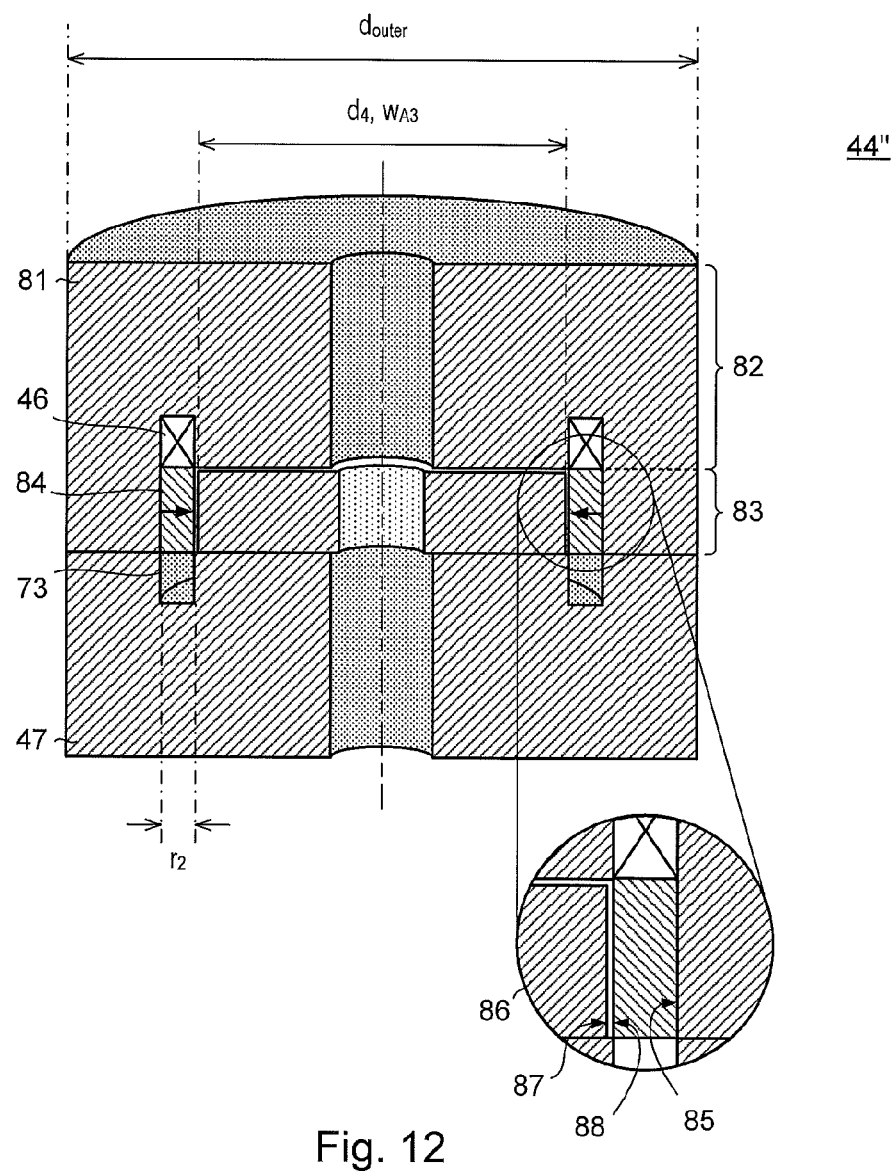
FIG. 12 is a perspective section of yet another solenoid actuator in accordance with the present invention.

Referring to FIG. 12, yet another actuator 44" is shown. The actuator 44" is similar to the actuator 44' shown in FIG. 11. However, the actuator 44" has a second pole piece 81 having base portion 82 similar to the second pole piece 48 (FIG. 10) described earlier and an annular wall portion 83 (or "pole extension") extending from base portion 82 towards the first pole piece 47. A permanent magnet 84 is fixedly disposed within a radially inner surface 85 of the wall portion 82. An armature 86 is disposed within an inner surface 88 of the pole magnet 84 and between the first and second pole pieces 47, 81. The magnetisation of the permanent magnet 84 is oriented radially so that the permanent magnet 84 generates a radial magnetic field and flux lines (not shown) enter through a radial side wall 87. A shown in FIG. 12, the armature 86 has a diameter, $d_4$, of 10.5 mm, the coil 46 has a radial diameter, $r_2$, of 1.2 mm and the pole pieces have a diameter of 20 mm. In this example, the narrowest width of magnetic material, $w_{A3}$, is effectively equal to the diameter of the armature, $d_4$.

The actuators 44, 44', 44" operate in substantially a similar way and will now be described with reference to the first actuator 44 (FIG. 7).

Referring again to FIG. 7, when the second coil 46 and, if present, the first coil 45 are not energised, the armature 51 is latched in a first position, abutting the first pole piece 47. As shown in FIG. 7, this position corresponds to a closed position in which the pintle head 41 is seated. The second coil 46 is energised by passing a current in a direction which attracts the armature 51 towards the second pole piece. If a first coil 45 is used, then current can also be passed through the first coil in the same sense. Thus, the pintle head 41 is unseated (shown in chain). Even though the armature 51 may reach the second pole piece 48, the stiff spring 53 prevents the armature 51 from being held once the coil is de-energised. Thus, when the current is reduced or switched off, the armature 51 travels back towards the first pole piece 47.

As explained earlier, to overcome the magnetic force to prevent open latching, a stiff spring is employed. Typically, the latching magnetic fields at the end of a stroke is about 1 to 1.5 T. This yields a force of about 40 to 90 Ncm$^{-2}$ of pole piece. If armature travel between poles is 50 μm, then the magnetic spring constant is about −1.6 to −3.6 Nμm$^{-1}$ per cm$^2$ of pole piece. The spring should have a spring constant, k, which exceeds this. Preferably, the spring constant, k, is about 20 to 100% bigger than the magnetic spring constant, i.e. about +2 to +4.5 Nμm$^{-1}$ per cm$^2$ of pole. Tube bellows have a sufficiently high value of spring constant. However, other forms of springs can be used, such as, for example, Belleville washers and flexures.

FIG. 13 shows a suitable form of flexure 89. The flexure 89 takes the form of a flat sheet flexure comprising a sheet 90 which is substantially planar having interdigitated slots 91 extending perpendicularly from opposing long sides 91, 92 of the sheet 90. The flexure 89 comprises full hard type 302 stainless steel. However, other suitable materials can be used. The flexure 89 has a length a, a width b, and a thickness c, wherein c<<a, b.

As shown in FIG. 13, the flexure 89 can be stretched (or compressed) between its ends 93, 94 parallel to the direction of travel. In other words, force is applied in the plane of flat flexure and not, for example, perpendicular to it.

This type of spring can be used instead of the tube bellows in the actuators 44, 44', 44" described earlier.

The actuator need not be axisymmetric (i.e. cylindrical), but may take a planar, laminate-type form, for example, with a box-shaped pole pieces and a rectangular armature, as will now be described.

Referring to FIGS. 14 and 14a, an actuator 96 is shown which operates along axis 97. The actuator 96 is generally elongate and is rectangular in plan view.

The actuator 96 includes first and second coils 98, 99 wound around first and second pole pieces 100, 101. The pole pieces 100, 101 generally take the form of 'U'-cores having a rectangular cross-section and are held, fixed with respect to each other, by a pair of rigid plates 102 via a first set of screws 103. A generally planar armature 104 which is generally rectangular in plan view sits between the pole pieces 100, 101. A rectangular permanent magnet 105 is embedded in the centre of the armature 104.

The plates 102 are attached to first and second opposite sides of the actuator 96.

A pair of flat sheet flexures 106 attaches the pole pieces 100, 101 to the armature 104 via the first set of screws 103 and a second set of screws 107 (which are not attached to the rigid plates 102). Each flexure 106 is sandwiched between the pole pieces 100, 101 and a respective rigid plate 102. Each plate 102 and flexure 106 is separated by a pair of spacer bars 108 or washers (not shown). The dimensions of the actuator 96 are about the same, i.e. u≈v, v≈w. The dimensions may be greater than 10 mm, greater than 20 mm or greater than 50 mm. The dimensions may be less than 100 mm. In this example, the actuator has dimensions u=14 mm, v=14 mm and w=12.5 mm. In this example, the narrowest width of magnetic material, $w_{A4}$, is effectively equal to the width of pole pieces, w. The actuator 96 need not be held together with screws. For example, some or all of the part can be welded, clamped or crimped.

The flexures 106 may have a (combined) spring constant, k, of at least 20 Ncm$^{-2}$×A/t or 40 Ncm$^{-2}$×A/t where A is the area of the poles and t is the gap length. In this example, A is about 0.2 to 5 cm$^2$ and t (and the length of travel) is less than 100 μm, for example, between about 30 and 80 μm.

One or more permanent magnets can be used and arranged in a number of different ways. For example, one permanent magnet can be used which may take the form of a single, continuous circular ring.

Referring to FIGS. 15a and 15b, examples of the use of annular permanent magnet are shown. FIG. 15a shows a single permanent magnet 26 in the form single, continuous circular ring disposed in a square armature 5. FIG. 15b shows a single permanent magnet 52 in the form single, continuous circular ring disposed in a disc-shaped armature 51. In FIGS. 15a and 15b, the area of a portion of the soft magnetic material $5_1$, $51_1$ lying inside of the permanent magnet 26 is about the same as the area of the portion of the soft magnet material $5_2$, $51_2$ lying outside of the permanent magnet 26.

More than one permanent magnet may be used. Thus, a set of two, three, four or more permanent bar magnets can be arranged angularly spaced around the centre of the armature (which also defines the axis of travel) having inwardly-directed magnetisations.

Referring to FIGS. 16a and 16b, examples of the use of several permanent magnets are shown. FIG. 16a shows four bar-shaped permanent magnets $26_1$, $26_2$, $26_3$, $26_4$ disposed in a square armature 5. The magnets are arranged in pair facing each other with magnetisations in opposite directions. One pair can be omitted such that there are only two magnets, e.g. first and third magnets $26_1$, $26_3$. FIG. 16b shows four bar-shaped permanent magnets $52_1$, $52_2$, $52_3$, $52_4$ disposed in a circular armature 51. Again one pair of magnets may be omitted. Likewise, the areas of the soft magnetic material lying inside and outside the magnets are about the same.

As explained earlier, one pair of magnets can be omitted so that there are only two magnets. However, the pair of magnets may extend across the armature.

Referring to FIG. 16c, and example is shown which comprises two bar magnets extending across the armature 51. The area of the soft magnetic material lying inside (i.e. between) the magnets $52_5$, $52_6$ is about the same as the area of the soft magnetic material lying outside the magnets $52_5$, $52_6$.

Where pole magnets are used, similar magnet arrangements can be used to those shown in FIGS. 15a, 15b, 16a, 16b and 16c.

In the examples described earlier, the permanent magnet (s) and armature lie in the same plane with magnetisations directed in plane. However, the arrangement can be modified by placing the permanent magnet(s) in a different plane from the armature and turning the permanent magnet(s) so that the magnetisations are no longer directed into the plane of the armature.

Referring to FIG. 17, another actuator 111 is shown. The actuator 111 is similar to the actuator 44' shown in FIG. 12 in that it uses a pole magnet.

The actuator 111 has an axis 112 around which a coil 113 is wound inside a cavity or blind recess 114 of a (multipart) pole piece 115. The pole piece 115 generally takes the form of toroid having a rectangular cross section. The pole piece 115 has a slot running along an inner surface 116 so as to form a 'C'-shaped core with first and second poles 117, 118. The actuator 111 houses an annular permanent magnet 119 whose magnetisation is directed parallel to the axis 112. Flux from the permanent magnet 119 is guided by a flat, truncated, cone-shaped annular piece or insert 120. The insert 120 has a right-hand triangular cross section which can guide flux axially directed flux so as to be radially directed. A flat armature 121 lies between the poles 117, 118. The actuator includes a stiff spring 122, e.g. having a spring constant, k, of at least 20 Ncm$^{-2}$×A/t or 40 Ncm$^{-2}$×A/t where A is the area of the poles and t is the gap length. In this example, A is about 0.2 to 5 cm$^2$ and t (and the length of travel) is less than 100 μm, for example, between about 30 and 80 μm. In this example, the narrowest width of magnetic material, $w_{A5}$, is effectively equal to the diameter of the armature.

As shown in FIG. 17, the armature 121 lies in a plane $P_1$ which is normal to the axis 112. However, the permanent magnet 119 lies in a parallel, but spaced apart plane $P_2$.

Figure 17A:
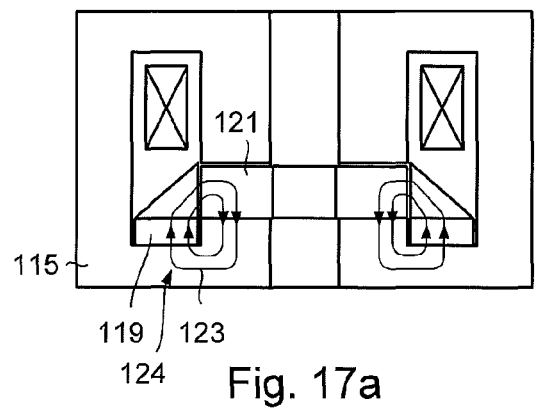
FIGS. 17a illustrates a first magnetic circuit when the armature of the actuator in FIG. 17 is in a first position.
Figure 17B:
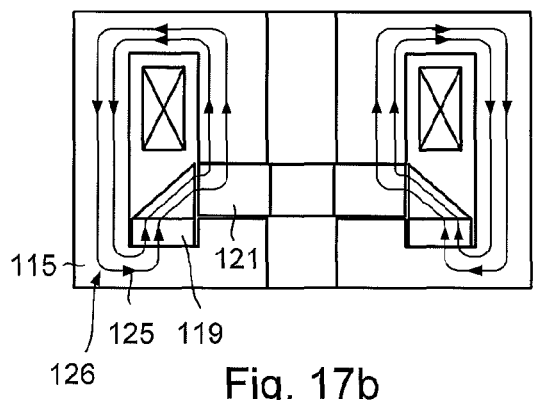
FIG. 17b illustrates a first magnetic circuit when the armature of the actuator in FIG. 17 is in a second position.

FIGS. 17a and 17b show magnetic flux 123, 125, flowing through respective magnetic circuits 124, 126 through the pole piece 115, magnet 119 and armature 121 when the armature is in first (lower) and second (upper) positions.

In the injectors described earlier, the actuators are dry-type actuators. However, the actuator may be a wet-type actuator in which the armature is disposed and moves within a tube or channel having thin walls through which a fluid (gas or liquid) can flow. The pole pieces, coils and, optionally, permanent magnet(s) are arranged outside the tube.

Figure 18:
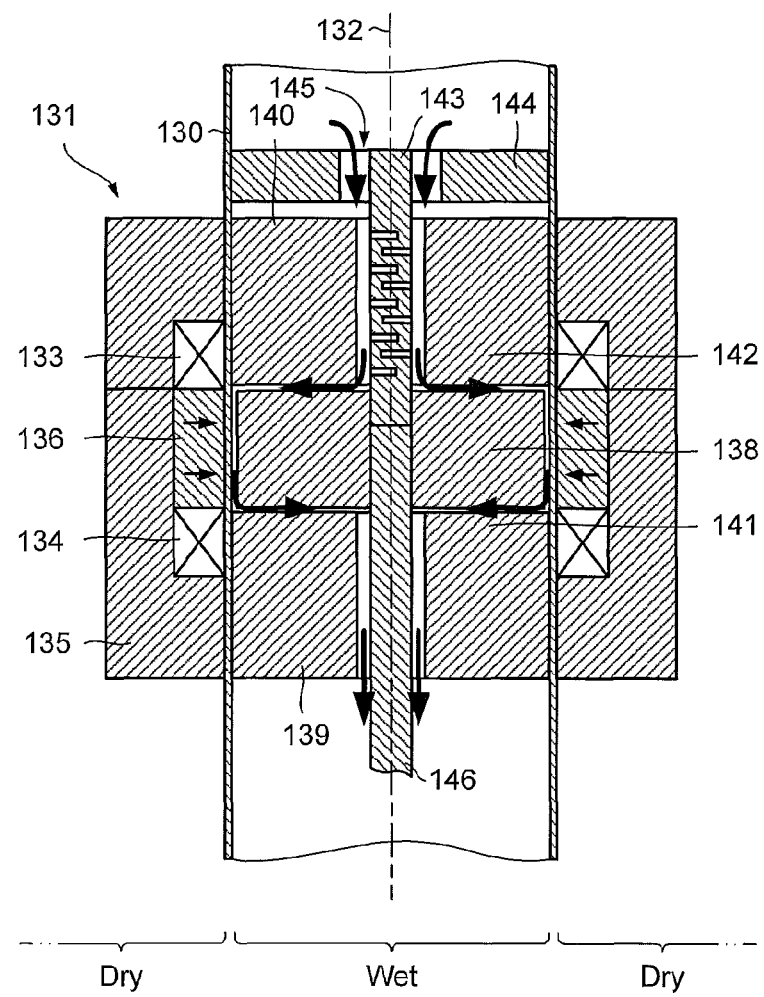
FIG. 18 is a section of a wet-type solenoid actuator and a pipe in accordance with the present invention.

Referring to FIG. 18, a pipe or tube 130 and an actuator 131 for controlling flow of a fluid through the pipe 130 are shown. The actuator 131 has a similar construction to the actuator 44" shown in FIG. 12. However, some of the parts of the actuator 131 are provided inside the pipe 130 and others parts are disposed outside the pipe 130.

The actuator 131 has an axis 132 around which first and second axially-spaced coils 133, 134 are wound inside an outer pole piece 135 which lies outside the pipe 130. The outer pole piece 135 is generally annular in shape and is made up of more than one part so as to fit it around the pipe 130. The outer pole piece 135 houses one or more permanent magnets 136 which lie either side or around the circumference of the pipe 130 between the first and second coils 133, 134. As shown in FIG. 18, the magnet(s) 136 have inwardly-directed magnetisations.

A disc-shaped armature 138 lies inside the pipe 130 between the permanent magnet(s) 136 and between axially-spaced inner pole pieces 139, 140. As shown in FIG. 18, the outer and inner pole pieces 135, 139, 140 generally form a 'C' shaped core with first and second poles 141, 142 between which the armature 138 lies.

The actuator 131 includes a stiff spring 143, e.g. having a spring constant, k, of at least 20 Ncm$^{-2}$×A/t or 40 Ncm$^{-2}$×A/t where A is the area of the poles and t is the gap length. In this example, A is about 0.2 to 5 cm$^2$ and t (and the length of travel) is less than 100 μm, for example, between about 30 and 80 μm.

The spring 143 takes the form of a slotted rod flexure attached, at one end, to the armature 138 and, at the other end, to the inside wall of the pipe 130 via a stiff plate 144 having through channels 145 which allow fluid to flow through the plate from one side to the other.

The actuator 131 also includes a pintle 146 having a head (not shown) which engages a seat (not shown).

This type of actuator can help to reduce the cost of manufacturing a fuel injector (or other type of fluid-flow control device). Moreover, this type of actuator may be used if it is preferred that the fuel inlet lies on the centre of the actuator.

Fuel (or other fluid) is kept from the coils 133, 134 by the thin tube 130. The tube 130 is thick enough to withstand fuel (or fluid) pressure, but is thin enough to let magnetic flux pass with minimum reluctance and eddy loss. For example, the tube can be formed from 0.12 mm-thick high-tensile magnetic stainless steel. However, other materials and/or thickness of tube can be used.

Embodiments of actuators according to the present invention can have one or more advantages.

For example, the permanent magnet bias permits a lower number of amp turns to be used, thus permitting a smaller coil cross section to be used and reducing the magnetic path length needed in the pole pieces. This can help reduce the magnetic leakage, which in turn allows an even lower number of amp turns needed to be used.

The actuator is easier to control and more effectively controlled using closed-loop position control than a conventional solenoid actuator since the actuator it has a linear response to drive current and because of the close coupled nature of the actuator.

The linear nature of the relation between current and force permits drivers to achieve faster performance by passing current through an actuator in either direction if required.

The relationship between overall moving mass (e.g. armature plus pintle in an injector application) can be tuned in the design to give the desired opening/closing speed by choosing the right spring constant. A stiffer spring gives a faster time, but requires more current to hold open.

Comparing FIG. 6d with FIG. 2d, it can be seen that up to double the opening force is available, as the opening magnetic force on the armature from the first pole 4 (FIG. 5) is joined by the spring force, released by the removal of the magnetic clamping force on the second pole 14 (FIG. 5).

The short gap in the magnetic circuit allows temperature compensation of the reversible reduction in flux from the bias magnets with temperature (~0.1%/° C. for NdFeB) by increasing the total gap as temperature drops to keep the rate of change of bias flux with armature position constant. This is done using a piece (or "separator") which sets the pole piece separation which has a lower expansion coefficient than the armature. For example, if the armature is 100 times thicker than the total gap, $t_{max}$, the difference in thermal coefficient between the separator and the armature is set to about 0.1%/° C. divided by 100, or 10 ppm/° C. For example, with an iron dust armature, this could be achieved by a Kovar or alumina spacer. With the spacer attached to the sides of the pole pieces, a larger total gap can be compensated, or a lower difference in thermal coefficient used. For example, a total (top plus bottom) flux gap of 100 μm can be compensated by a spacer having a 5 ppm lower expansion coefficient than the armature and pole piece materials having a 20 mm distance between the attachments to the upper and lower pole pieces similar to the arrangement shown in FIG. 14.

It will be appreciated that various modifications may be made to the embodiments hereinbefore described. Such modifications may involve equivalent and other features which are already known in the design, manufacture and use of actuators and component parts thereof and which may be used instead of or in addition to features already described herein. Features of one embodiment may be replaced or supplemented by features of another embodiment.

For example, the spring may comprise two or more springs or other resilient biasing means. The spring(s) may be arranged to bias the armature in other positions. For example, the armature may latch at both ends of travel of the armature.

The actuator may be used in different types of fuel injector, for example, which use gasoline, diesel, liquid petroleum gas, hydrogen or compressed natural gas. The actuator may be used in after treatment injector, such as for AdBlue® or other selective catalytic reduction systems. The fuel injector need not be a pintle-type injector, but can be, for example, a needle-type injector.

The actuator need not be used in an injector, but can be used in an automotive pump to transfer, for example, gasoline, diesel, water or lubricant. The actuator can be used as a pressure and/or flow control actuators for valves, for example, engine valves, inlet and exhaust valves, air flow or ABS.

The actuator can be used pump or control flow of a fluid, which may be a gas or a fluid. For example, the actuator may be used in a pneumatic or hydraulic.

The actuator may be used in a loudspeaker or as a servo tool.

The actuator may have a stroke of up to 100 µm, up to 200 µm or up to 500 µm.

The permanent magnet(s) may be positioned at different distances from the centre of the armature. For example, the permanent magnet(s) may separate the armature into an inner region having a width or diameter, $2 \cdot w_1$, and an outer region having width or diameter, $w_2$. The ratio, $2 \cdot w_1/w_2$ may lie between about 1 to 4 and preferably be about 2, such that the flux density in the inner and outer regions is about the same. The permanent magnet(s) may have an annular width, $w_c$, and the ratio $w_c/w_1$ may be between about 0.2 to 1 and preferably be about 0.5 such that the magnet takes up relatively little of the armature.

The permanent magnet and the coil(s) may be coterminous, e.g. when the permanent magnet is annular having the same inner and outer diameters as the coil. However, the permanent magnet and the coil(s) may be approximately coterminous, e.g. when four permanent magnets are used, they may be arranged so as to sit over the coil. The armature is preferably flat and planar, e.g. a circular or oval disc or rectangular or polygonal plate or sheet.

The spring may be formed from materials other than steel, for example, a material having a Young's modulus of at least $150 \times 10^9 \, \text{Nm}^{-1}$.

A low-k spring applying a constant or small force, for example in the form of a conventional coil spring, can be used to help trim the device.

Other hard and soft magnetic materials can be used. For example, the pole pieces and soft magnetic regions of the armature can be formed from electrical steel laminate, either stacked or wound, or wound from spin melt ribbon, such as Nanoperm®. The pole pieces may be laminated. The permanent magnet(s) can be formed from other rare earth materials or ferrite. Both armature and pole magnets can be used.

In the examples described earlier, the coils are held in the pole pieces and, thus, are fixed. However, in some embodiments, the coils may move with the armature.

In some embodiments, a single pole piece providing two poles can be used.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A short travel solenoid actuator comprising:
    a tube or channel wherein the tube or channel is formed from a single material;
    at least one pole piece;
    an armature which lies inside the tube or channel;
    an electromagnet coil which lies outside the tube or channel and which is arranged, in response to energisation, to cause travel of the armature between first and second positions;
    a permanent magnet which lies outside the tube or channel which is positioned and orientated so as to magnetically latch the armature in the first and second positions when the armature is in the first and second positions respectively; and
    a spring arranged to bias the armature and configured to provide sufficient force so as to prevent the armature from latching in the second position.

2. An actuator according to claim 1, wherein the permanent magnet is supported by the at least one pole piece.

3. An actuator according to claim 1, wherein the actuator comprises at least two permanent magnets disposed either side of the centre of the armature which have inwardly or outwardly orientated magnetisations.

4. An actuator according to claim 1, wherein the permanent magnet is annular.

5. An actuator according to claim 1, further comprising another electromagnet coil.

6. An actuator according to claim 1, wherein the at least one pole piece provides first and second poles spaced apart along a direction of the travel of the armature and wherein the armature is disposed between the first and second poles.

7. A device for controlling fluid flow comprising an actuator according to claim 1.

8. A fuel injector comprising an actuator according to claim 1.

9. An actuator according to claim 1, wherein the actuator provides linear actuation which enables variable lift.

10. An actuator according to claim 1, wherein the at least one pole piece comprises inner and outer pole pieces and wherein the outer pole piece lies outside the tube or channel and wherein the inner pole piece lies inside the tube.

11. An actuator according to claim 1, which exhibits a linear relation between current driven through the electromagnet coil and force.

12. A solenoid actuator according to claim 1, wherein the at least one pole piece comprises:
    first and second inner pole pieces which lie inside the tube; and
    an outer pole piece which lies outside the tube.

13. A solenoid actuator according to claim 1, wherein the tube or channel is formed from high-tensile magnetic stainless steel.

14. An actuator according to claim 1, wherein the spring comprises two or more springs or other resilient biasing means.

15. An actuator according to claim 1, which exhibits a linear relation between current driven through the electromagnet coil and force, optionally in either current direction such that a current in a positive direction in the coil results in a positive force and a current in a negative direction in the coil results in a negative force.

16. An actuator according to claim 1, wherein the permanent magnet and the coil are coterminous.

17. An actuator according to claim 1, wherein the spring has a spring constant, k, which exceeds a magnetic spring constant of the actuator, preferably 20% to 100% bigger that the magnetic spring constant.

18. An actuator according to claim 1, configured such that, when the armature is at a third position between the first position and the second position and when there is zero current through the electromagnetic coil, the permanent magnet provides a magnetic force to bias the actuator towards the first position.

19. An actuator according to claim 1, comprising:
a pintle comprising an integral spring.

20. An actuator according to claim 1, for use in a fuel injector having a valve head and valve seat and which is operable to cause the valve head to be retracted or extended to unseat the valve head from the valve seat.

21. An actuator according to claim 1, configured to have an opening and/or closing time between about 50 µs and about 0.2 ms.

22. An actuator according to claim 1, for use in a fuel injector having a pintle and which is operable to cause the pintle to reciprocate linearly between retracted and extended positions.

23. An actuator according to claim 1, wherein the pole pieces provide first and second poles spaced apart along the direction of travel and wherein the armature is disposed between the first and second poles.

24. An actuator according to claim 1, wherein magnetic flux from the coil substantially does not go through the permanent magnet.

25. A gasoline pump comprising an actuator according to claim 1.

* * * * *